United States Patent
Impson et al.

(10) Patent No.: US 7,720,458 B2
(45) Date of Patent: May 18, 2010

(54) RAPIDLY DEPLOYABLE EMERGENCY COMMUNICATIONS SYSTEM AND METHOD

(75) Inventors: Jeremy D. Impson, Vestal, NY (US);
Nader Mehravari, Ithaca, NY (US);
John O. Moody, Vestal, NY (US); Eric R. Steinbrecher, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 2121 days.

(21) Appl. No.: 10/446,495

(22) Filed: May 27, 2003

(65) Prior Publication Data

US 2004/0023635 A1 Feb. 5, 2004

Related U.S. Application Data

(60) Provisional application No. 60/384,310, filed on May 30, 2002.

(51) Int. Cl.
*H04M 11/04* (2006.01)

(52) U.S. Cl. ............... 455/404.2; 455/404.1; 455/456.1; 701/207; 340/359.13

(58) Field of Classification Search ............... 455/404.2, 455/404.1, 456.1; 701/207; 340/539.13
See application file for complete search history.

(56) References Cited

U.S. PATENT DOCUMENTS

| | | | |
|---|---|---|---|
| 4,152,647 A | 5/1979 | Gladden et al. ............... 325/4 |
| 4,383,332 A | 5/1983 | Glance et al. ................. 455/33 |
| 5,185,697 A | 2/1993 | Jacobs et al. ................ 364/419 |
| 5,276,686 A | 1/1994 | Ito .............................. 370/95.1 |
| 5,389,935 A * | 2/1995 | Drouault et al. ............. 342/457 |
| 5,519,761 A | 5/1996 | Gilhousen ..................... 379/59 |
| 5,678,219 A | 10/1997 | Agarwal et al. ............. 455/280 |
| 5,787,111 A | 7/1998 | Gilmore ...................... 375/200 |
| 6,026,277 A | 2/2000 | Gavrilovich ............... 455/11.1 |
| 6,047,160 A | 4/2000 | Priest et al. ................. 455/11.1 |
| 6,069,948 A | 5/2000 | Yrjänä ........................ 379/230 |

(Continued)

FOREIGN PATENT DOCUMENTS

JP          05191340          7/1993

(Continued)

OTHER PUBLICATIONS

*The Electronic Product Code (EPC)—A Naming Scheme for Physical Objects*, David L. Brock, MIT Auto-ID Center, MIT, 77 Massachusetts Ave., Building 3-449G, Cambridge, MA 02139-4307, Published Jan. 1, 2001.

(Continued)

*Primary Examiner*—Danh C Le
(74) *Attorney, Agent, or Firm*—Burns & Levinson LLP; Kathleen Chapman; Jacob Erlich

(57) ABSTRACT

A system and method for rapid deployment of economically feasible wide-area general-purpose telecommunications systems and services in urban, suburban, rural, and other inhabited geographical areas is disclosed. The solution described here is of particular importance in the aftermath of such events as catastrophic accidents, natural disasters, terrorist attacks, riots, and acts of war during which the local telecommunications infrastructure is destroyed. In addition, the basic methods and architectures defined herein are applicable to those scenarios in which wide-area telecommunication services must be deployed rapidly in previously uninhabited area such as military deployments.

20 Claims, 14 Drawing Sheets

U.S. PATENT DOCUMENTS

| | | | |
|---|---|---|---|
| 6,104,712 | A | 8/2000 | Robert et al. ............... 370/389 |
| 6,243,585 | B1 | 6/2001 | Pelech et al. ............... 455/449 |
| 6,370,232 | B1 | 4/2002 | Yrjana ....................... 379/37 |
| 6,381,533 | B1 * | 4/2002 | Crane et al. ................ 701/200 |
| 6,477,387 | B1 * | 11/2002 | Jackson et al. ............. 455/519 |
| 7,194,395 | B2 * | 3/2007 | Genovese ................... 703/6 |
| 2002/0115444 | A1 * | 8/2002 | Yu et al. .................... 455/456 |
| 2002/0164962 | A1 * | 11/2002 | Mankins et al. ............. 455/99 |
| 2002/0188522 | A1 | 12/2002 | McCall et al. .............. 705/26 |
| 2003/0187571 | A1 * | 10/2003 | Impson et al. ............. 701/117 |

FOREIGN PATENT DOCUMENTS

| | | |
|---|---|---|
| JP | 08249569 | 9/1996 |
| JP | 09093175 | 4/1997 |
| JP | 10224513 | 8/1998 |
| JP | 11154918 | 6/1999 |
| JP | 2001112066 | 4/2001 |

OTHER PUBLICATIONS

*An Analysis of the Fundamental Constraints On Low Cost Passive Radio-Frequency Identification System Design*, Tom A. Scharfeld, MIT Department of Mechanical Engineering, 77 Massachusetts Ave., Cambridge, MA 02139-4307, Published Aug. 2001.

*Towards the 5 ¢ Tag,*. Sanjay Sarma, MIT Auto-ID Center, MIT, 77 Massachusetts Ave., Building 3-449G, Cambridge, MA 02139-4307, Published Nov. 1, 2001.

*How the EPC Network Will Automate the Supply Chain*, http://www.autoidcenter.org/aboutthetech_idiotsguide.asp, Last updated 2002.

*Why Focus on Radio Frequency Identification?*, http://www.autoidcenter.org/aboutthetech_whyfocus.asp, Appears to have been last updated 2002.

*Auto-ID Based Control—An Overview*, Duncan McFarlane, MIT Auto-ID Center, MIT, 77 Massachusetts Ave., Building 3-449G, Cambridge, MA 02139-4307, Published Feb. 1, 2002.

U.S. Appl. No. 10/114,167, filed Apr. 2, 2002. Applicants: Jeremy D. Impson et al. Title: Real-Time Ad Hoc Traffic Alert Distribution.

U.S. Appl. No. 60/384,310, filed May 30, 2002. Applicants: Nader Mehravari et al. Title: Rapidly deployable emergency communications system.

* cited by examiner

RAPIDLY DEPLOYABLE EMERGENCY COMMUNICATIONS SYSTEM AND METHOD

CROSS REFERENCE TO RELATED APPLICATIONS

The present application claims priority to U.S. Provisional Application No. 60/384,310 filed May 30, 2002 entitled RAPIDLY DEPLOYABLE EMERGENCY COMMUNICATIONS SYSTEM which is incorporated herein in its entirety by reference.

BACKGROUND OF THE INVENTION

This invention relates generally to rapid deployment of telecommunications systems, and in particular to the deployment and use of infrastructureless networks for emergency purposes.

A common characteristic of natural, man-made, accidental, or intentional disasters is the damage to, or destruction of, buildings and other outdoor structures such as communication antennas, radio towers, and utility poles. Such damage and destruction can cause the local telecommunications infrastructure to become inoperative and/or overloaded. Systems that can be affected by such disasters include residential and commercial telephone service, cellular telephone service, and mobile radio systems used by local, state, and federal emergency and law enforcement agencies. Disasters can occur in urban, suburban, and rural areas, and can be the result of such diverse events as, for example, catastrophic accidents, natural disasters, or intentional attacks. Even in non-disaster situations, such as for example, military deployments, basic wide-area telecommunication services might need to be deployed rapidly in previously uninhabited areas.

For example, a disaster has occurred, one which affects a large number of people over a large geographical area, spanning anywhere from many city blocks to 10's of miles in suburban or rural areas. Buildings and other outdoor structures (such as antennas, radio towers and utility poles) are damaged or destroyed. All or portions of the local telecommunications infrastructure—including regular telephone system and the cellular telephony system used by inhabitants; land mobile radio systems used by local, state, and federal emergency and law enforcement agencies, etc.—are inoperative. The portions that might have survived are tremendously overloaded. This disaster may be a natural one—such as multiple tornado strikes, an earthquake, volcanic eruptions, or floods—or it may be accidental, due to plane crashes, train derailments, or refinery explosions. The disaster may be intentional, or it may take place in an area where means for communication is limited to begin with, or in an area where millions of citizens could need access to telecommunication services. A common problem in all of these situations is the need for immediate communication among emergency personnel, law enforcement agencies, and the local citizens.

To properly support this type of situation, a system is needed which is designed to be general purpose and hence capable of supporting any application that used to be supported by the damaged or destroyed system that it is trying to replace. The system needs to be standards-based and hence can be used with existing end-user communication devices. Further, the system needs to be economically affordable by local and state governing bodies. The system should be capable of temporarily replacing a destroyed communications network (e.g. cellular telephone service) and operating for weeks or even months, and the equipment of the system should be useful for a non-emergency situation as well. The system should be capable of inter-operating with any modern internet protocol-based network, allowing it to be connected to standard networks like the internet.

SUMMARY OF THE INVENTION

The problems set forth above as well as further and other problems are solved by the present invention. The solutions and advantages of the present invention are achieved by the illustrative embodiment of the present invention described hereinbelow.

The method of the present invention includes the steps of receiving location and severity information and determining positions to locate mobile communications platforms based on location and severity information. For operator-deployed mobile communications platforms, the method of the present invention further includes the steps of contacting personnel and instructing them to transport mobile communications platforms to located positions. The method further includes the steps of setting up mobile communications platforms and initiating communication among the mobile communications platforms. For self-deployed mobile communications platforms, the method further includes the steps of directing the mobile communications platforms to their assigned locations, and remotely providing instruction for initiation of operations. The method also includes the step of establishing a temporary communications infrastructure at the located positions. The method also includes the steps of transmitting control information to the mobile communications platforms and receiving data from the mobile communications platforms.

The Emergency Communications System (ECS) of the present invention includes a plurality of mobile communication platforms, a planner subsystem, a dispatch subsystem, a control subsystem, and optionally a training subsystem. Numerous mobile communications platform designs are possible, depending upon varying capability requirements and technical and cost constraints. Certain specialized mobile communications platforms can exist for special purposes. For example, fire trucks can contain a mobile communications platform so that the location of firefighters inside the burning buildings can be monitored. Other mobile communications platforms can be located on rooftops of buildings to function as bridges to other networks. Still other mobile communications platforms be located in a temporary tower and in a dedicated radio truck. A mobile communications platform can provide cellular telephony service, so that standard cell phones continue to function. One goal of the ECS is to quickly erect a temporary multi-use communications infrastructure where no such infrastructure exists (or cannot be relied upon). The ECS can provide voice, data, and visual imagery via wireless means over the incident area, and to one or more local or non-local control centers. Furthermore, the ECS can actively assist in tracking incident workers, victims, assets, and the on-site conditions. These data can be made available to site coordinators, and even to on-site incident workers.

For a better understanding of the present invention, together with other and further objects thereof, reference is made to the accompanying drawings and detailed description.

DETAILED DESCRIPTION OF THE INVENTION

The present invention is now described more fully hereinafter with reference to the accompanying drawings, in which various illustrative embodiments of the present invention are shown.

The system and method of the present invention provide an emergency communications system for managing the establishment of emergency personnel, equipment, and communications in the vicinity of the incident. More specifically, and referring now to FIG. 1, the method of the present invention is shown to includes the steps of receiving location and severity information of an incident, preferably at a dispatch center, which may be a police station or fire station (method step 11), and determining positions in which to locate mobile communications platforms based on the received location and severity information (method step 13). At the same moment that the local volunteer and professional firefighters, emergency medical personnel, and rescue workers are mobilized to respond to an incident, the ECS is also triggered into action. The goal of the ECS is to quickly, for example, within less than two hours, deploy and make operational a temporary general-purpose telecommunications infrastructure at the incident site. A function of an ECS is to provide basic telecommunication services such as those normally provided by the Public Switched Telephone System (PSTN), cellular telephone systems, and the Mobile Land Radio (MLR) systems.

Figure 1:
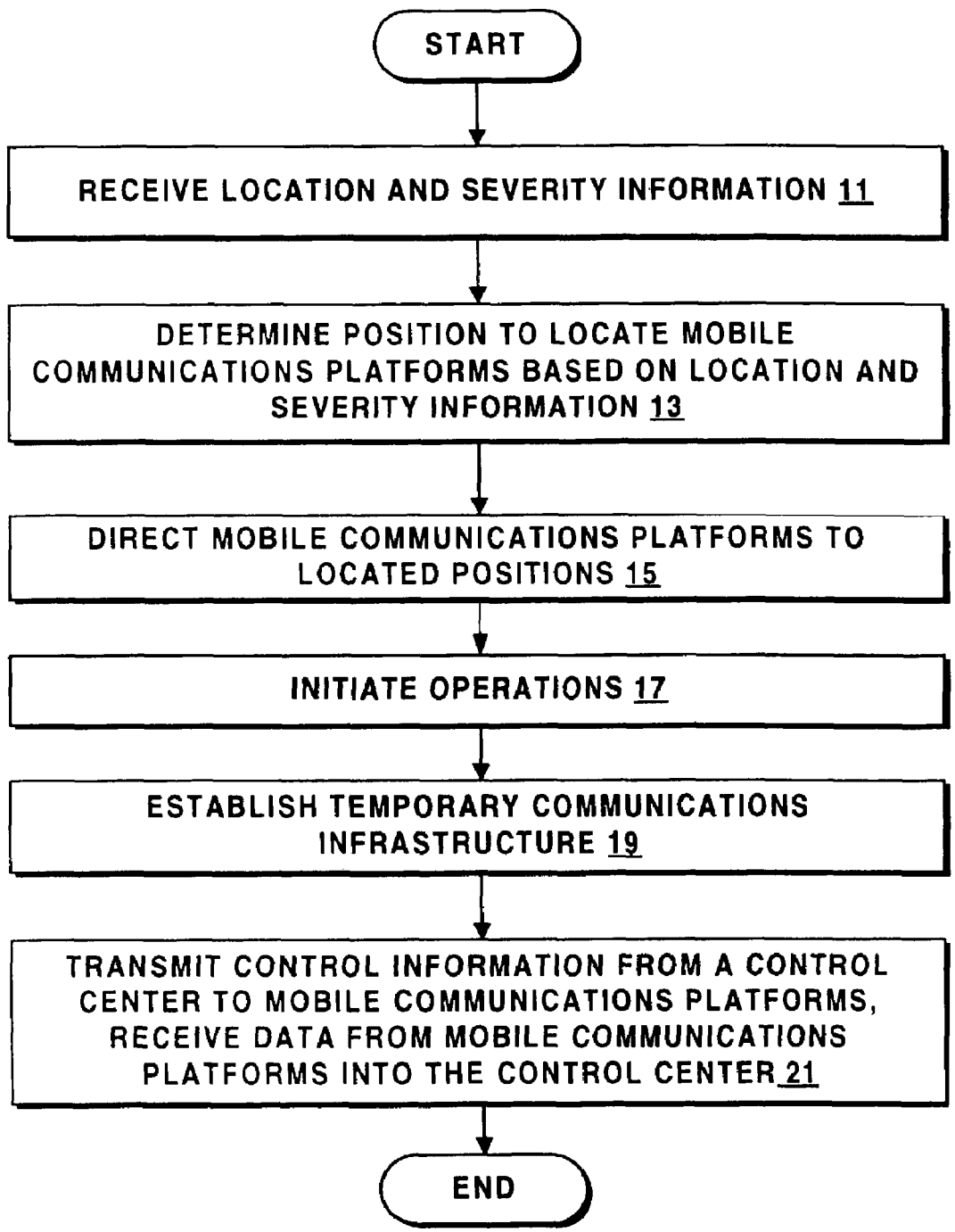
FIG. 1 is a flowchart of the method of the present invention.

Continuing to refer to FIG. 1, the method next includes the step of contacting appropriate personnel and, in the case of operator-deployed mobile communications platforms, instructing them to transport the mobile communications platforms to the determined positions (method step 15). In a similar manner to how volunteer firefighters are alerted of a fire emergency while they are at home or at their places of work, or how a local elementary school principal can within minutes inform many hundreds of parents of an event at their child's school through a pre-arranged telephone-tree, appropriate personnel are notified that their services are needed. Depending on the situation, the notification could be achieved in numerous ways, for example, but not limited to, manual telephone-trees automated Internet-based messaging, gathering at predetermined locations, town-wide emergency bullhorns, etc. Appropriate personnel could include, for example, emergency services personnel who are, at the time of the incident of interest, physically located near the site of the incident. After being notified of the incident, appropriate personnel travel to one or more predetermined ECS pickup locations. Mobile communications platforms are self-deployed or operator-deployed to particular locations in or around the incident site. These locations are chosen to provide the best wireless and cellular coverage over and around the incident site. The physical size of the mobile communications platforms is not restricted in any way.

With further reference to FIG. 1, the method also includes, the step of initiating operations of the mobile communications platforms (method step 17). There is no limitation on the number, size, or functionality of the set-up procedures for the mobile communications platforms. Previously-trained personnel deploy the mobile communications platforms, performing functions such as, but not limited to, installing a vehicle-mountable (potentially telescopic) antenna, connecting the mobile communications platform to an electric power source (for example, the vehicle's electrical system, fossil-fuel generators, solar cells, fuel cells, etc.), powering up the mobile communications platform, and performing some rudimentary testing to verify proper operation of the mobile communications platform. Mobile communications platforms may be partially or wholly pre-configured to go through an automated self-configuration after deployment. After operations on the mobile communications platforms are initiated, the method also includes the step of establishing a temporary communications infrastructure in the vicinity of the incident (method step 19). With this temporary communications infrastructure, the inhabitants in the vicinity of the incident can, for example, use their telephones. This step also involves creating a network with the mobile communications platforms as nodes, which are the temporary communications infrastructure, and providing interconnection of the mobile communications platform network with external undamaged communications infrastructures.

Continuing to refer to FIG. 1, the method also includes the step of transmitting, among the mobile communications platforms and preferably to a dispatch center, data and control information to track the progress of the incident, and to direct control of a response to the incident (method step 19). Mobile communications platforms communicate through use of an electronic network, and collect data for transmission around the network from such sources as, but not limited to, radio, telephone, video, and computers. Each mobile communications platform provides, at least, communication with other mobile communications platforms, communication with external networks, and standards-based wireless telecommunication services to devices within the range provided by the technology.

The method of the present invention can be, in whole or in part, implemented electronically. Signals representing actions taken by elements of the system can travel over electronic communications media. Control and data information can be electronically executed and stored on computer-readable media. The system can be implemented to execute on a node in a computer network. Common forms of computer-readable media include, for example, a floppy disks, flexible disks, hard disks, magnetic tapes, or any other magnetic media, CDROMs or any other optical media, punched cards, paper tape, or any other physical media with patterns of holes, RAMs, PROMs, EPROMs, FLASH-EPROMs, or any other memory chip or cartridge, carrier waves, smart cards, compact flash cards, flash memory, or any other media from which a computer can read.

Figure 2:
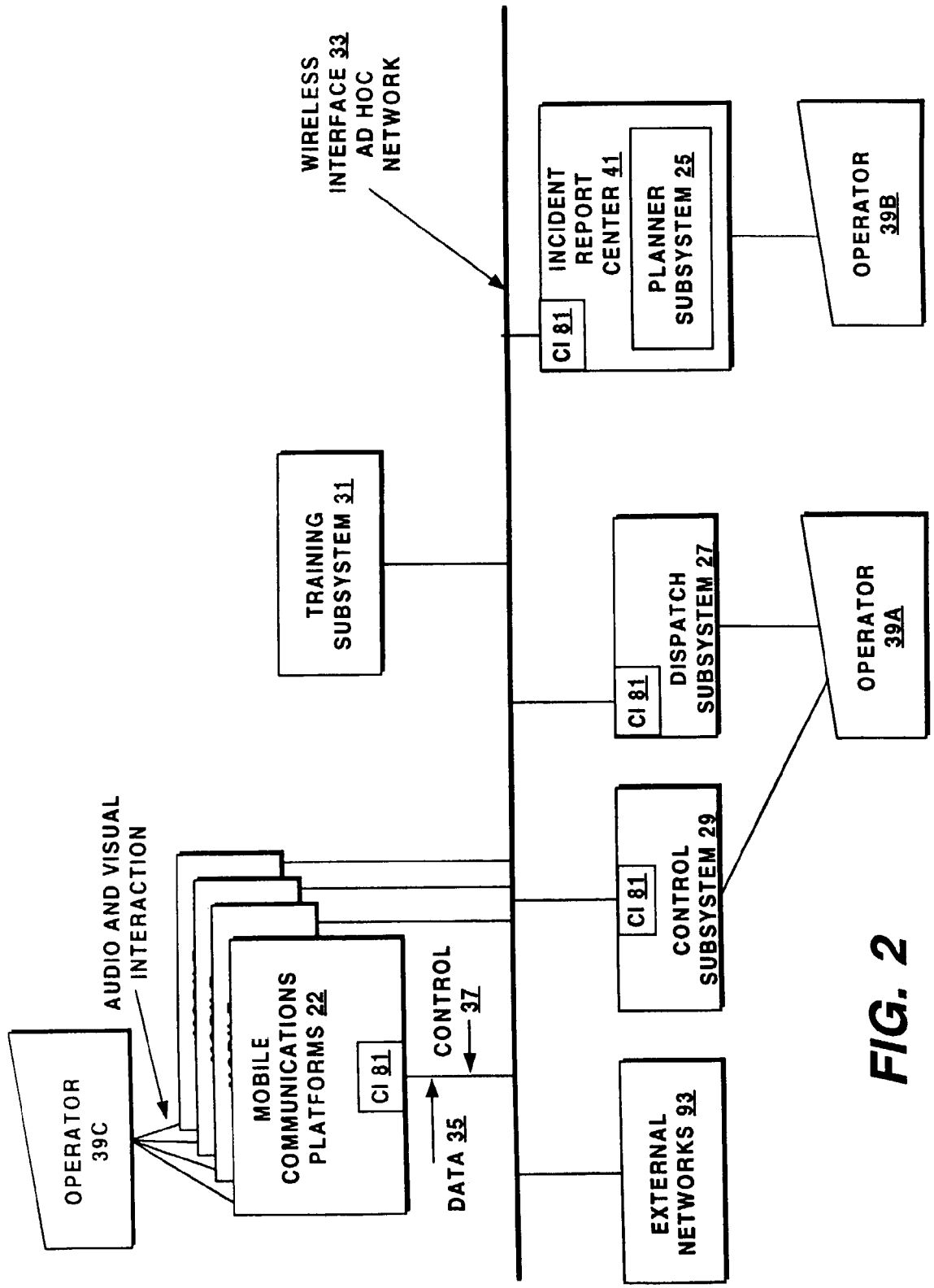
FIG. 2 is a schematic block diagram of the major components of the present invention.

Referring now to FIG. 2, the ECS includes planner 25, dispatch 27, and control 29 subsystems to implement the method of the present invention. The division of functionality within these subsystems herein presented is not intended to limit other possible such divisions. Any division of functionality, so long as the functions of the present invention are performed, is within the scope of this invention. Note also that the automated portions of the subsystems can execute in the same CPU, or they can execute in a distributed way in separate CPUs, or any combination of combined and separate execution, or they can execute in the mobile communications platforms 22, and/or the incident report center 41. Mobile communications platforms 22 and incident report center 41 can be physically co-located, even executing within the same CPU, or they can be physically separated, communicating through wireless interface 33 and communications interface (CI) 81.

Continuing to refer to FIG. 2, the ECS is engaged when operator 39A provides the location and best available severity information of the incident to planner subsystem 25. An emergency dispatcher, a local emergency coordinator, or some other person of authority can perform this action as part of a local or regional emergency reaction plan. Location and severity information can be provided at the incident report center 41, which could be executing planner subsystem 25, or which could be in communication with a system that is executing planner subsystem 25. Planner subsystem 25 locates components of the ECS and determines how to position them in order to provide the communications infrastructure that will ultimately operate through wireless interface 33. In particular, the planner subsystem 25 can determine where mobile communication platforms 22 must be located with respect to the previously-specified location and severity information to best provide wireless audio, video, and data services over and around the site of interest.

Continuing to refer to FIG. 2, once planner subsystem 25 determines the best possible locations for mobile communications platforms 22, planner subsystem 25 invokes dispatch subsystem 27 which, in the case of operator-deployed mobile communications platforms 22, contacts personnel and directs them to transport mobile communications platforms 22 to the locations determined by planner subsystem 25 and to set them up. In the case of self-deployed mobile communications platforms 22, dispatch subsystem 27 electronically directs (through information provided as control 37) mobile communications platforms 22 to the locations determined by planner subsystem 25. Planner subsystem 25 then invokes control subsystem 29 which manages the interfaces among mobile communications platforms 22 and their movement during the incident. Control subsystem 29 manages incident termination. Mobile communications platforms 22 send data 35 to dispatch 27, control 29, and planner 25 subsystems. Training subsystem 31 is described with respect to FIG. 7.

Figure 3:
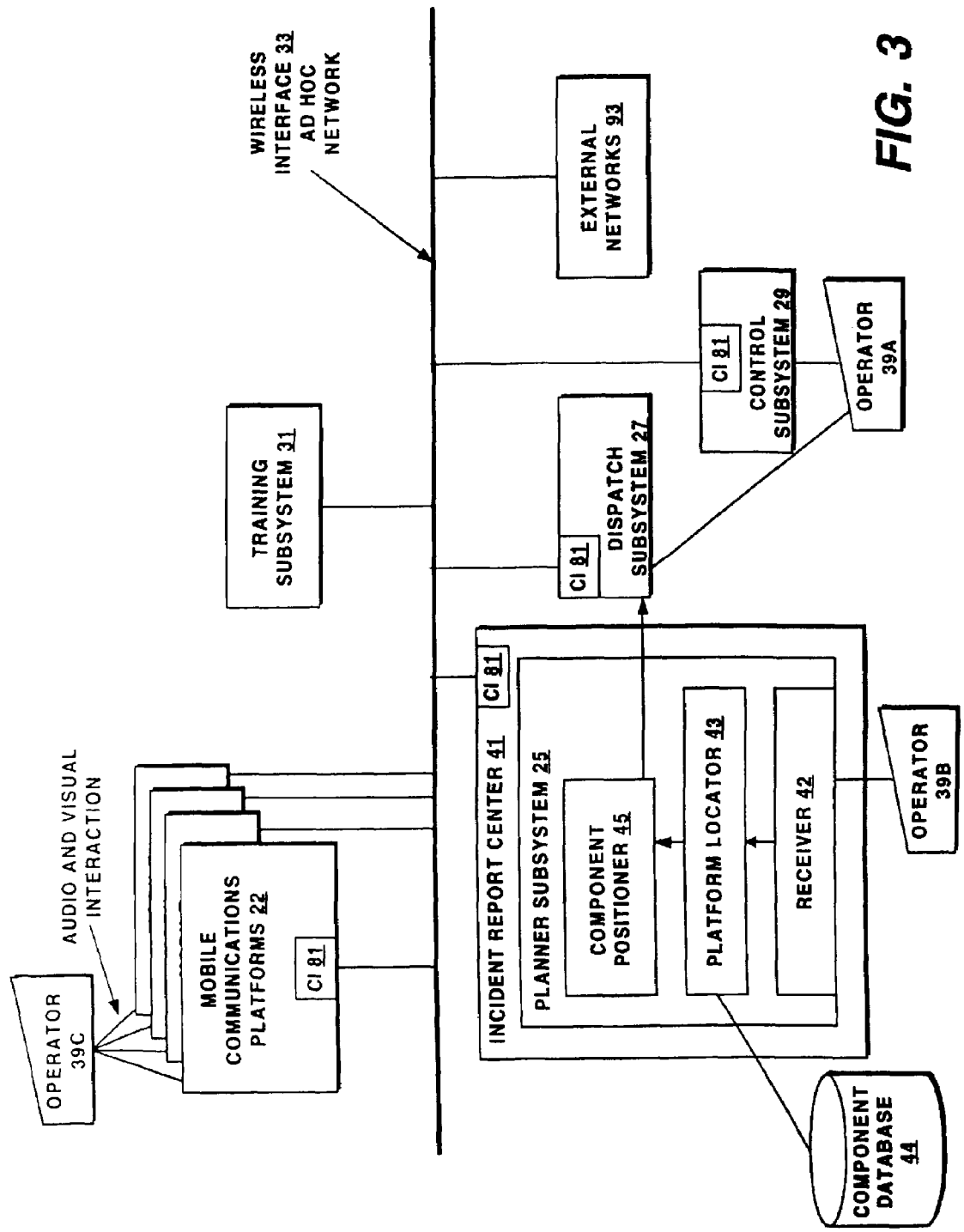
FIG. 3 is a schematic block diagram of the major components of the planner subsystem.

Referring now to FIG. 3, planner subsystem 25 includes receiver 42, platform locator 43, and component positioner 45. Receiver 42 accepts from operator 39B the location and severity of the incident. Receiver 42 provides this information to platform locator 43, which determines which mobile communications platforms 22 are appropriate to activate for the particular incident. Mobile communications platforms 22 are, in the illustrative embodiment, pre-stored at various locations, known by platform locater 43, such as, for example, schools, firehouses, police depots, and local government buildings. Mobile communications platforms 22 could be stored in any fixed or mobile location, not limited to fixed-position structures such as government facilities and private residences. These locations are provided by platform locator 43 to component positioner 45 which determines, from, for example, but not limited to, the location of the incident, which mobile communications platforms 22 are to be deployed in which locations and provides this information to dispatch subsystem 27, perhaps by means of CI 81.

Figure 4:
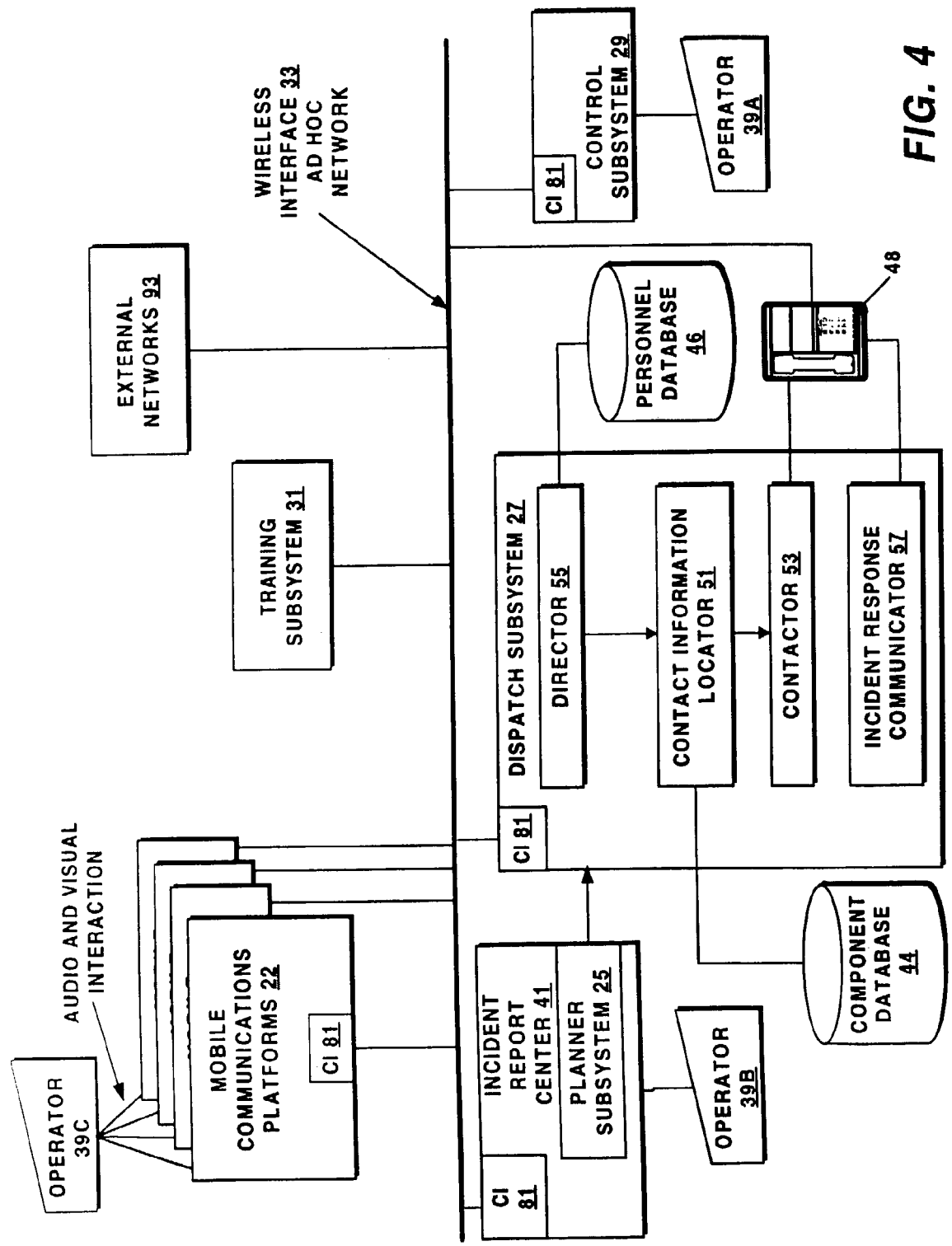
FIG. 4 is a schematic block diagram of the major components of the dispatch subsystem.

Referring now to FIG. 4, dispatch subsystem 27 includes a contact information locater 51, a contactor 53, a director 55, and optionally, a incident response communicator 57. Director 55 generates a list of appropriate personnel for the incident, perhaps derived from a previously-determined list of personnel who have pledged to act during an incident. Contact information locater 51 locates contact information for appropriate personnel for the incident according to any preset or dynamically-determined criteria. Contactor 53 contacts personnel using, for example, a conventional telephone-based interactive voice response system 48 such as, for example, Alcatel OmniTouch® Interactive Voice Response, to dial each number in a list of telephone numbers. The conventional telephone-based interactive voice response system 48 is configured to, in the illustrative embodiment, on receiving no answer or a negative answer at a dialed number, dial the next number on the list. Director 55 determines a match between contacted personnel and platform location (determined by platform locater 43 (FIG. 3)), and directs contacted personnel to pick up particular mobile communications platforms 22 at the determined location. The personnel, perhaps trained by optional training subsystem 31 (described with respect to FIG. 7), set up mobile communication platforms 22 and provide power to them which automatically invokes control subsystem 29. Optionally, and in parallel with deployment of personnel with mobile communications platforms 22, incident response communicator 57, if tied to an emergency telephone system similar to 911, could, for example, communicate the incident and/or a proper response to the incident to inhabitants of the area surrounding the incident. Note that if the communications infrastructure in the vicinity of the incident has been severely compromised, a subset of the complete suite of mobile communications platforms 22 is either operator-deployed or self-deployed in order to establish a temporary communications infrastructure (described below), thus enabling more personnel to be contacted and more mobile communications platforms 22 to be deployed.

Figure 5:
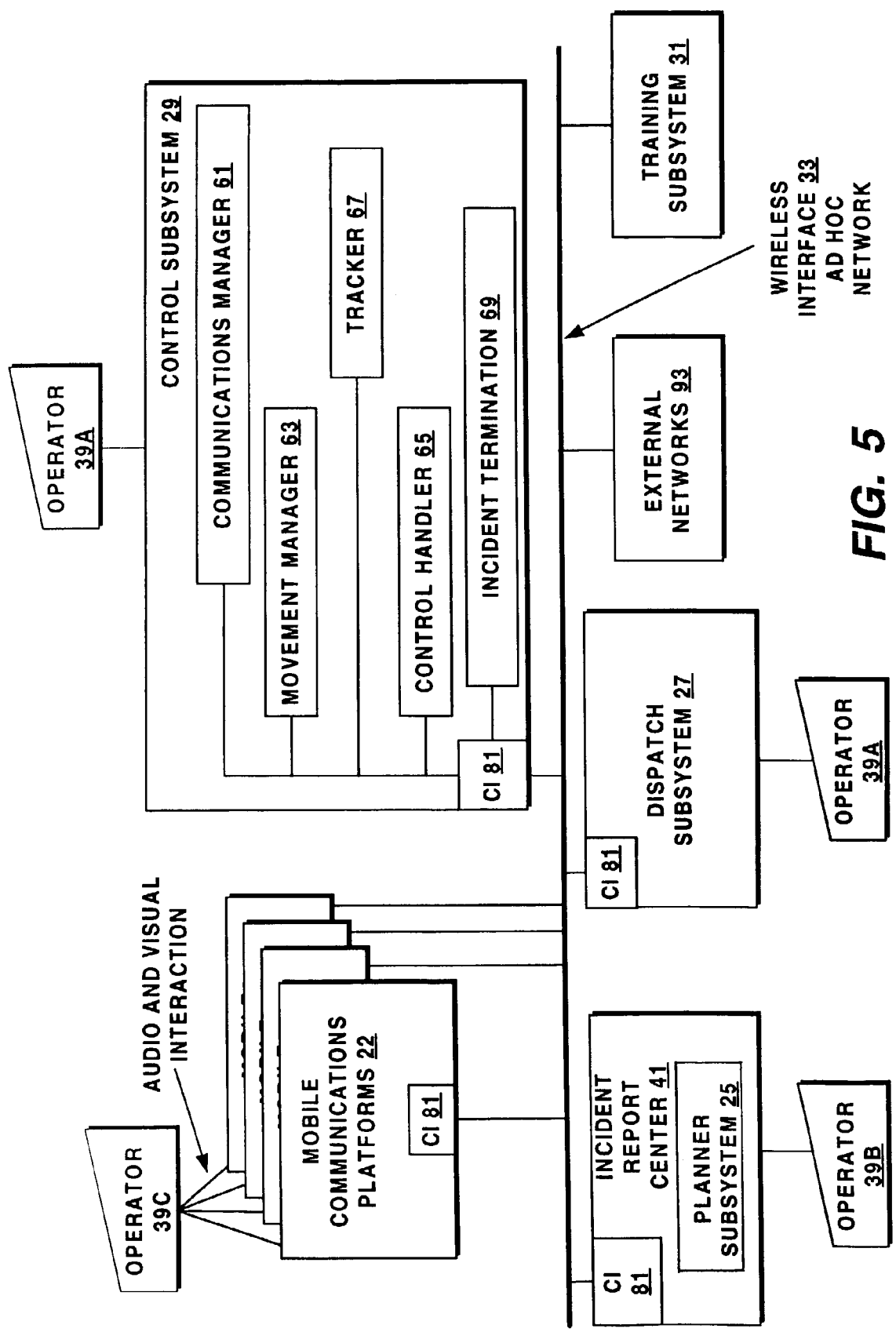
FIG. 5 is a schematic block diagram of the major components of the control subsystem.

Referring now to FIG. 5, control subsystem 29 includes communications manager 61, movement manager 63, control handler 65, tracker 67, and incident termination 69. Communications manager 61, through CI 81, enables personnel at the incident to communicate with each other and to coordinators. In particular, communications manager 61 determines the aspects of the communications infrastructure in the vicinity of the incident and manages their temporary establishment.

Figure 6:
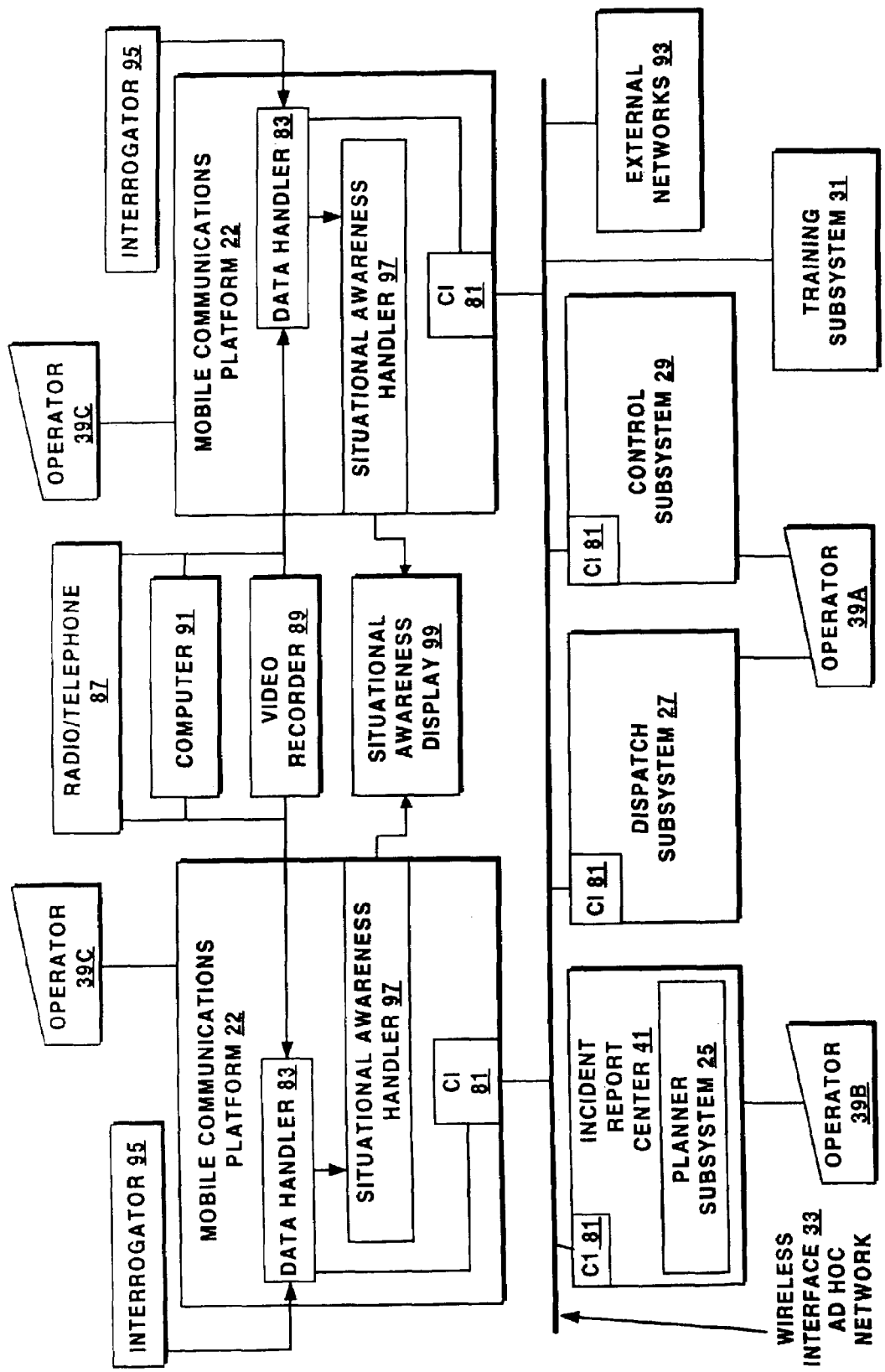
FIG. 6 is a schematic block diagram of the major components of the mobile communications platform.

Communications manager 61 insures that network connectivity is achieved and maintained, and that high-priority communications take precedence on the network. Communications manager 61 provides network services needed for internode communication, and manages a publish/subscribe mechanism used to distribute video and other data collected by mobile communication platforms 22 and other sources. Further, communications manager 61 manages data routing between nodes of the ECS network and external networks 93 (FIG. 6). Communication manager 61 provides an infrastructure for cellular phones, radio frequency identification interrogators 95 (FIG. 6), and wireless mobile devices in use by the emergency workers and victims as well as for transmitting surveillance data. Communications manager 61 receives data from external networks 93 and routes them to personnel as needed. For example, Emergency Medical Technicians could access a database of exotic diseases or of hazardous materials handling procedures. Movement manager 63, control handler 65, and incident termination 69 enable automatic and manual dissemination of orders and information updates, perhaps received from external networks 93, to personnel. Tracker 67 monitors location and status of personnel and equipment associated with the incident. In the illustrative embodiment, and for administrative and control purposes, one or more mobile communications platforms 22 can be designated as a "control node" in which control handler 65 manages and controls the operations of the network of mobile communications platforms 22. The control node may also be accessible by coordinators who monitor situational awareness display 99 (FIG. 6), looking for potential problems, as well as for people in need. Control handler 65 is capable of relinquishing its control to other entities if/when necessary. Control handler 65 receives direction from any of operators 39A, B, or C (which could in fact be one and the same person or computer or other means of supplying direction) and provides that direction to personnel, devices, other platforms, etc., depending on the nature of the direction. Control handler 65 monitors the relative positions of mobile communications platforms 22 and orders their reorganization should the situation change. Incident termination 69 controls the orderly dismantling of the ECS network.

Referring now to FIG. 6, mobile communications platforms 22 form the core of the ECS. Each mobile communications platform 22 is a node that forms part of an ad hoc communications network (described later) with other mobile communications platforms 22 and incident report center 41 through their communication interfaces 81. Mobile communications platforms 22 can be equipped with such devices as radios/telephones 87, video recorders 89, and computers 91, and may carry communications, computing, and sensor equipment necessary to provide and restore wireless and cellular coverage over and around the incident area. Mobile communications platforms 22 enable surveillance and location tracking, and are designed for non-stop performance. Further, mobile communications platforms 22 enable connection, if possible, through communications interface 81, to external networks 93, including, but not limited to, libraries, databases, and the internet. In the illustrative embodiment, mobile communications platforms 22 are quickly moved into place, and are designed for non-stop performance over long periods of time, for example, but not limited to, days, weeks, or months. Designed for high mobility, mobile communications platforms 22 can be configured as compact and self-contained, and can be surrounded by a weatherproof exterior. During configuration, mobile communications platforms 22 may be packaged, for example, so that their equipment can fit into suitcase-sized containers, or they may be packaged to be carried in or mounted on vehicles (see FIGS. 8-10 and 12-13), or they may be packaged to be sent aloft using scientific instrumentation balloons (see FIGS. 11 and 14), thereby providing greater range in hilly terrain.

Continuing to refer to FIG. 6, once mobile communications platforms 22 are in place, communications manager 61 (FIG. 5) begins transmitting readiness status and sensor information through communications interface 81 between/among one or more mobile communications platforms 22 and/or incident report center 41. CI 81 enforces quality of service, data priority, and authentication through use of advanced ad hoc mobile routing protocols. Further, CI 81 supports coordination and routing services over low bandwidth and unreliable network links. This functionality enables communications manager 61 (FIG. 5) to control the establishment of the temporary communications infrastructure in the vicinity of the incident. In addition, CI 81 scales to a large number of nodes, and is capable of automatically configuring and updating network routes. Supporting further a mobile environment, CI 81 automatically routes messages in a dynamic environment where nodes enter and leave the network at will and nodes move throughout the physical environment. To implement these capabilities, CI 81 enables wireless interface 33 (FIG. 2) and other types of communication, and enables the formation of a distributed ad hoc communications network. An ad hoc communications network is one in which mobile units interact with one another without a centralized infrastructure. In an ad hoc network, mobile units may not continuously remain in range of each other, thus the topology of the network is maximally dynamic. Characteristic of an ad hoc network, CI 81 minimizes the delay between when a node enters, leaves, or moves and when the network readjusts to that change (ideally making the readjustment almost instantaneously). Many protocols support ad hoc networking, for example, Destination-Sequenced Distance-Vector (DSDV) protocol, Dynamic Source Routing (DSR), and Ad Hoc On-Demand Distance Vector (AODV) routing protocol. Each protocol has features that serve a particular type of ad hoc network.

Continuing to refer to FIG. 6, data handler 83, through CI 81, receives data from and controls devices that gather information about the incident, such as, for example, conventional video cameras 89 and Radio Frequency Identification (RFID) radio frequency scanners or interrogators 95 such as, for example, interrogators included in Matrics™ RFID systems. Data handler 83 provides the gathered information to control subsystem 29 (FIG. 5), possibly through CI 81.

In the illustrative embodiment, and continuing to refer to FIG. 6, to enable tracking, personnel and equipment may carry conventional RFID electronic product code (ePC) tags. RFID interrogator 95 sends radio waves towards the ePC tags, powering them. The tags broadcast their individual ePCs, which are received by interrogator 95. Data handler 83 receives these data from interrogator 95, and provides them to tracker 67 (FIG. 5) through CI 81 and other sources for display and analysis. Data handler 83 also receives video data and provides those data to tracker 67. Tracker 67, using a known location (known via a system such as the Global Positioning System) and triangulation data shared between two or more mobile communications platforms 22, locates and identifies equipped personnel and equipment. Tracker 67 then sends the location and identity information to situational awareness handler 97 which displays this information dynamically on situational awareness display 99, which is a display of the incident site. Personnel and equipment tracking can be accomplished in any way and is not limited to RFID technology. Control rooms, which may be located in places such as an emergency shelter, a government building, or a specially converted vehicle where it can travel to the disaster site, contain situational awareness displays 99. Situational awareness handler 97 displays in real-time icons and other indicators on situational awareness displays 99 representing the location of the incident, personnel and equipment, perhaps victims, and other entities, such as hospitals. In the case of victims, their immediate health status can be provided through any means to data handler 83 through CI 81 and displayed on the situational awareness display 99.

Figure 7:
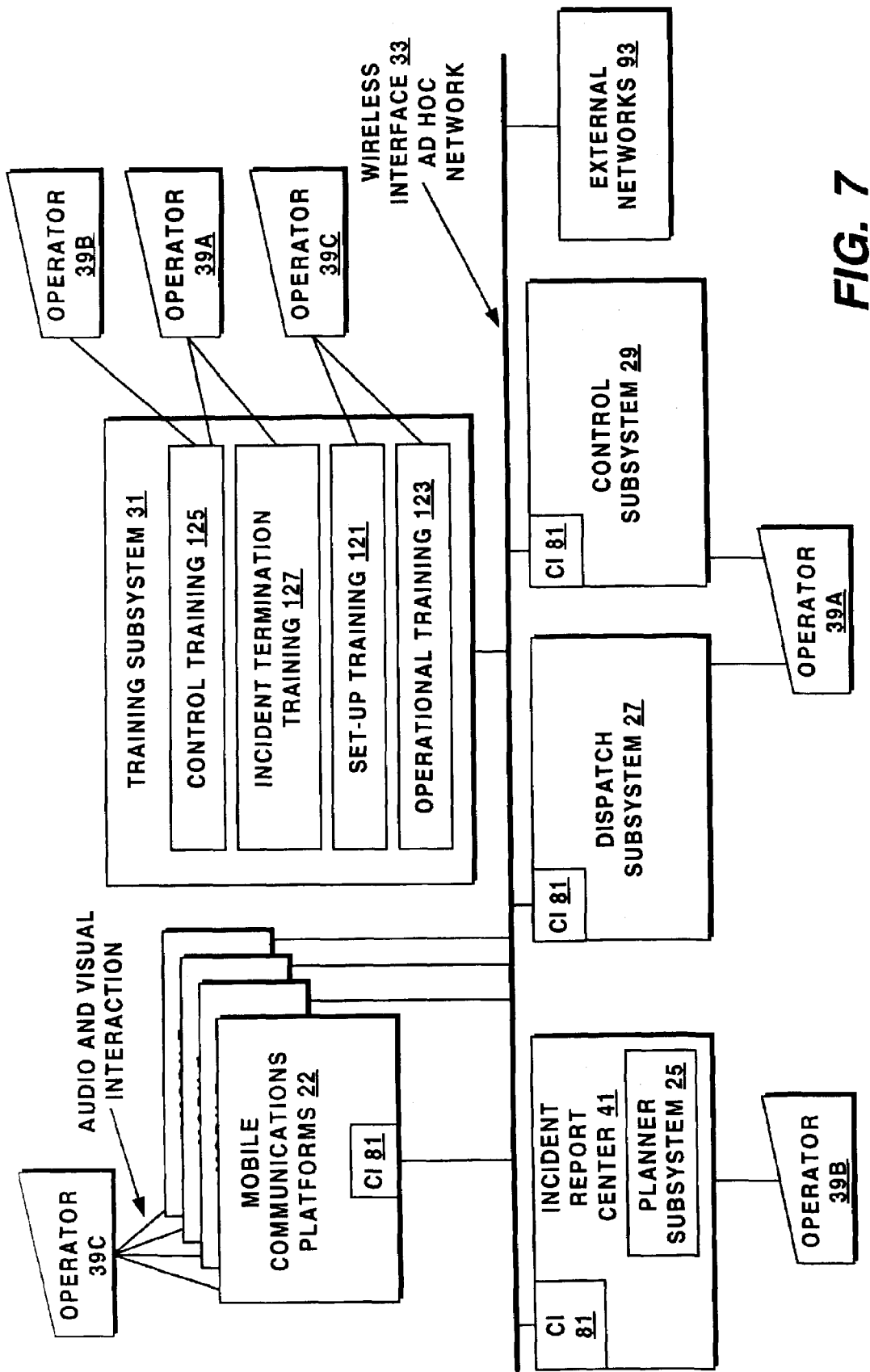
FIG. 7 is a schematic block diagram of the major components of the optional training subsystem.

Referring now to FIG. 7, optional training subsystem 31 provides personnel with necessary training to enable them to deploy mobile communications platforms 22 and other associated devices. These personnel can be, but aren't limited to, firefighters, policemen, emergency medical services personnel, members of community organizations, city/state/town employees (e.g. local transit service operators), employees of a local school district (e.g., school bus drivers), and employees of local federal agencies (e.g. the National Guard, the National Transportation Safety Board, the Federal Emergency Management Administration, or the United States Postal Service), and are willing to assist with incident response. Training subsystem 31 includes mobile communications platform 22 set-up training 121, operational training 123, control training 125, and incident termination training 127. These training modules can be completely or partially self-paced instruction. Although ideally, all personnel are trained in all aspects of the system, there can be specialized training for particular types of operations, for example, mobile communications platform personnel (operator 39C) could be required to complete set-up training 121 and operational training 123 only, whereas dispatchers (operator 39B) could be required to complete control training 125 only. Control room personnel (operator 39A) could be required to complete both control training 125 and incident termination training 127. Training subsystem 31 could be available for use within the ad hoc network formed by the mobile communications platforms 22 as shown in FIGS. 2-7, or it could be a stand-alone module available for use outside of the operational environment.

Figure 8:
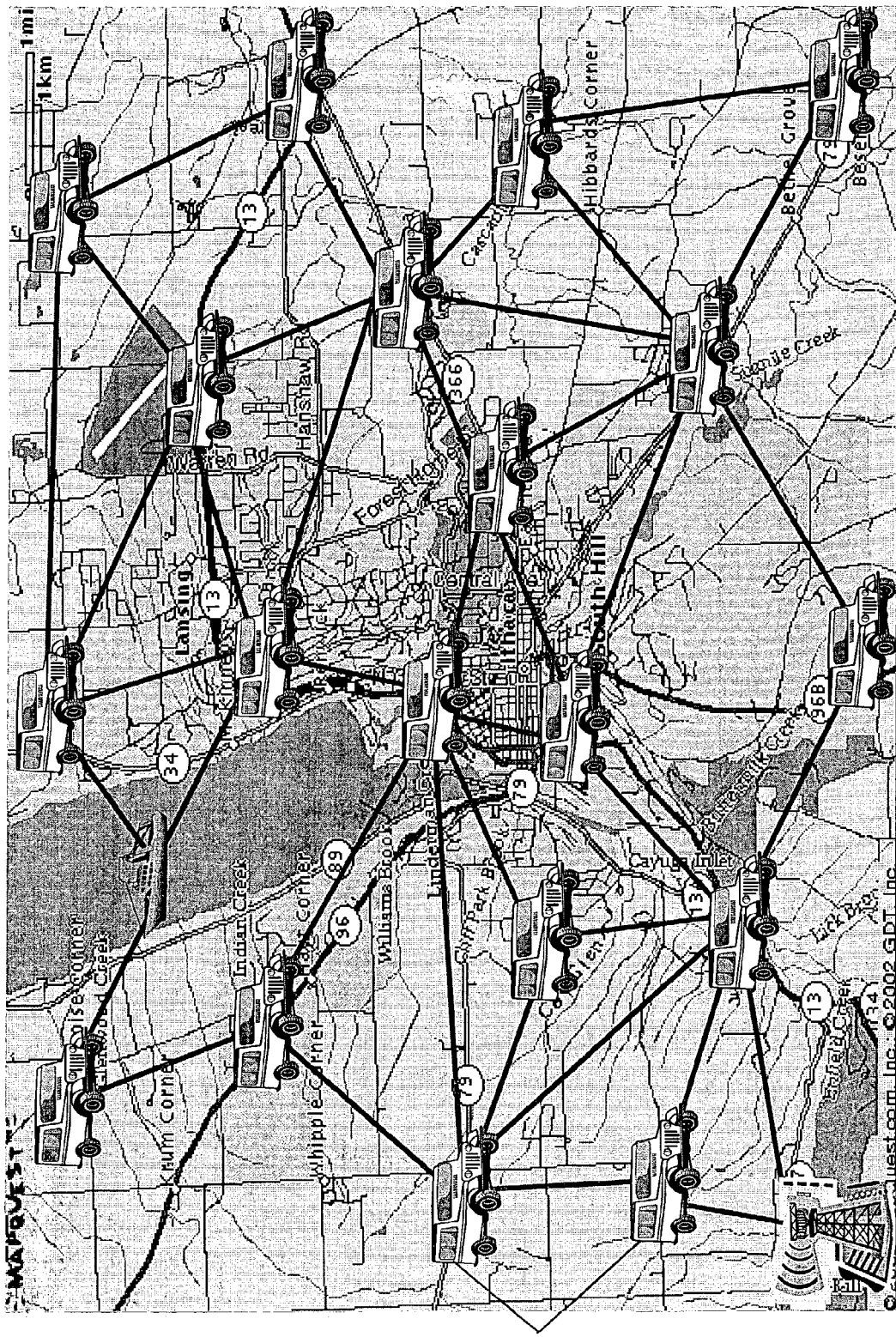
FIG. 8 is a diagram of the illustrative embodiment of the present invention in which postal service carrier vehicles host the mobile communications platforms of the ECS, and an incident occurs in an urban setting near a body of water.
Figure 9:
FIG. 9 is a diagram of an alternate embodiment of the present invention in which school buses host the mobile communications platforms of the ECS, and an incident occurs in mountainous terrain in a rural setting.
Figure 10:
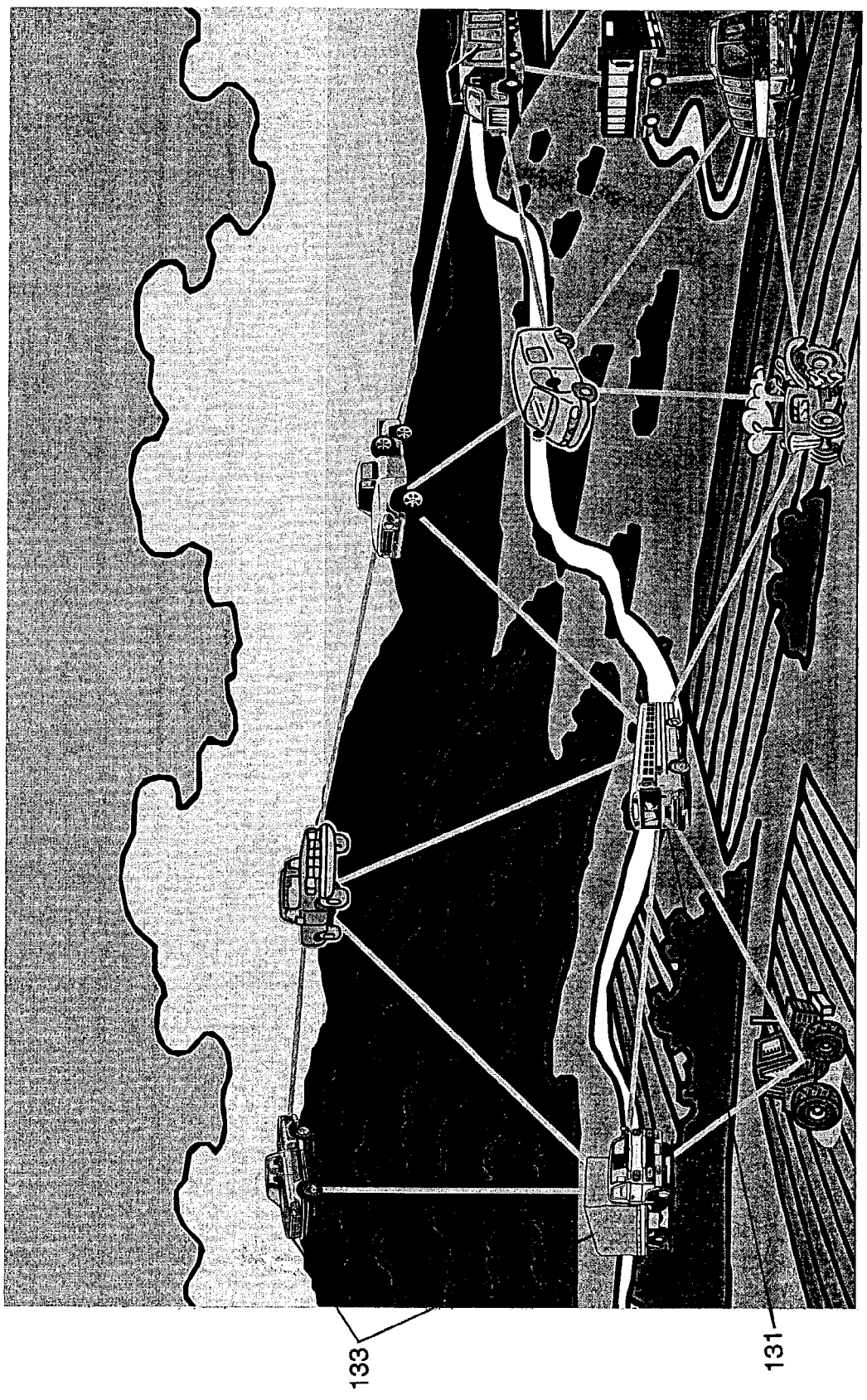
FIG. 10 is a diagram of a further alternate embodiment of the present invention in which a combination of public and private vehicles host the mobile communications platforms of the ECS, and an incident occurs in hilly terrain in a farming community.

Referring now to FIGS. 8-10, the system and method of the present invention can efficiently utilize the local fleet of public vehicles 131 (for example postal service mail trucks and school buses) or private vehicles (for example family cars or commercial trucks) to transport mobile communications platforms 22 establish an ECS. This is particularly efficient since many of local fleets of public vehicles 131 remain unused during incidents due to, for example, closure of public schools or interruptions in mail delivery. Also, as shown in FIGS. 8-10, mobile communications platforms 22 can be deployed in an urban setting (FIG. 8), in mountainous terrain (FIG. 9), and in hilly farmland (FIG. 10).

Referring now to FIG. 10, the system and method of the present invention can be implemented with a combined use of both public vehicles 131 and private vehicles 133. This flexibility is a result of the compact and portable nature of mobile communications platforms 22, which can be transported by virtually any means.

Figure 11:
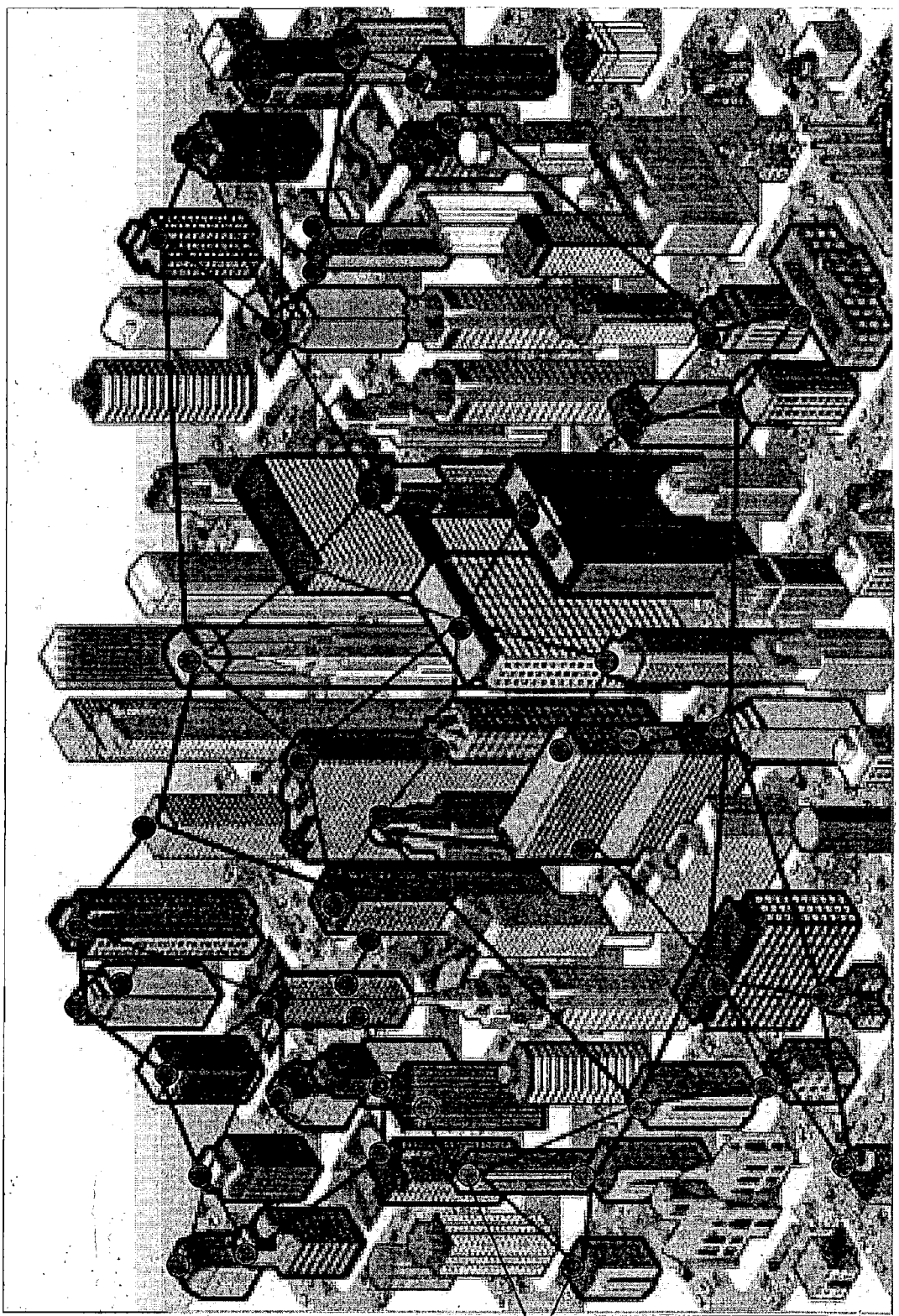
FIG. 11 is a diagram of a still further alternate embodiment of the present invention in which rooftops host the mobile communications platforms of the ECS, and an incident occurs in a large city.
Figure 12:
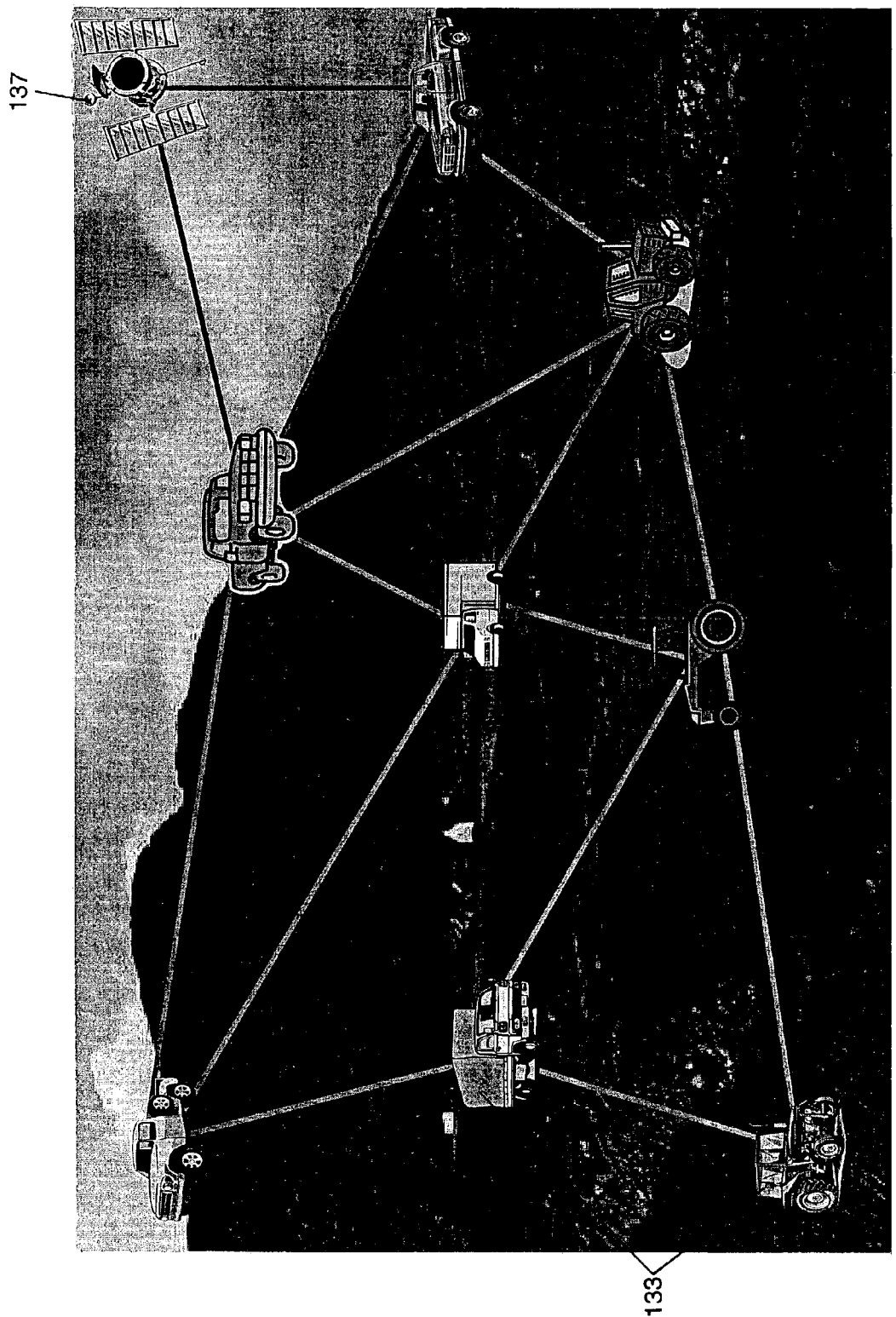
FIG. 12 is a diagram of another alternate embodiment of the present invention in which personal vehicles and farming vehicles in conjunction with commercial satellites host the mobile communications platforms of the ECS, and an incident occurs in hilly terrain in a farming community.
Figure 13:
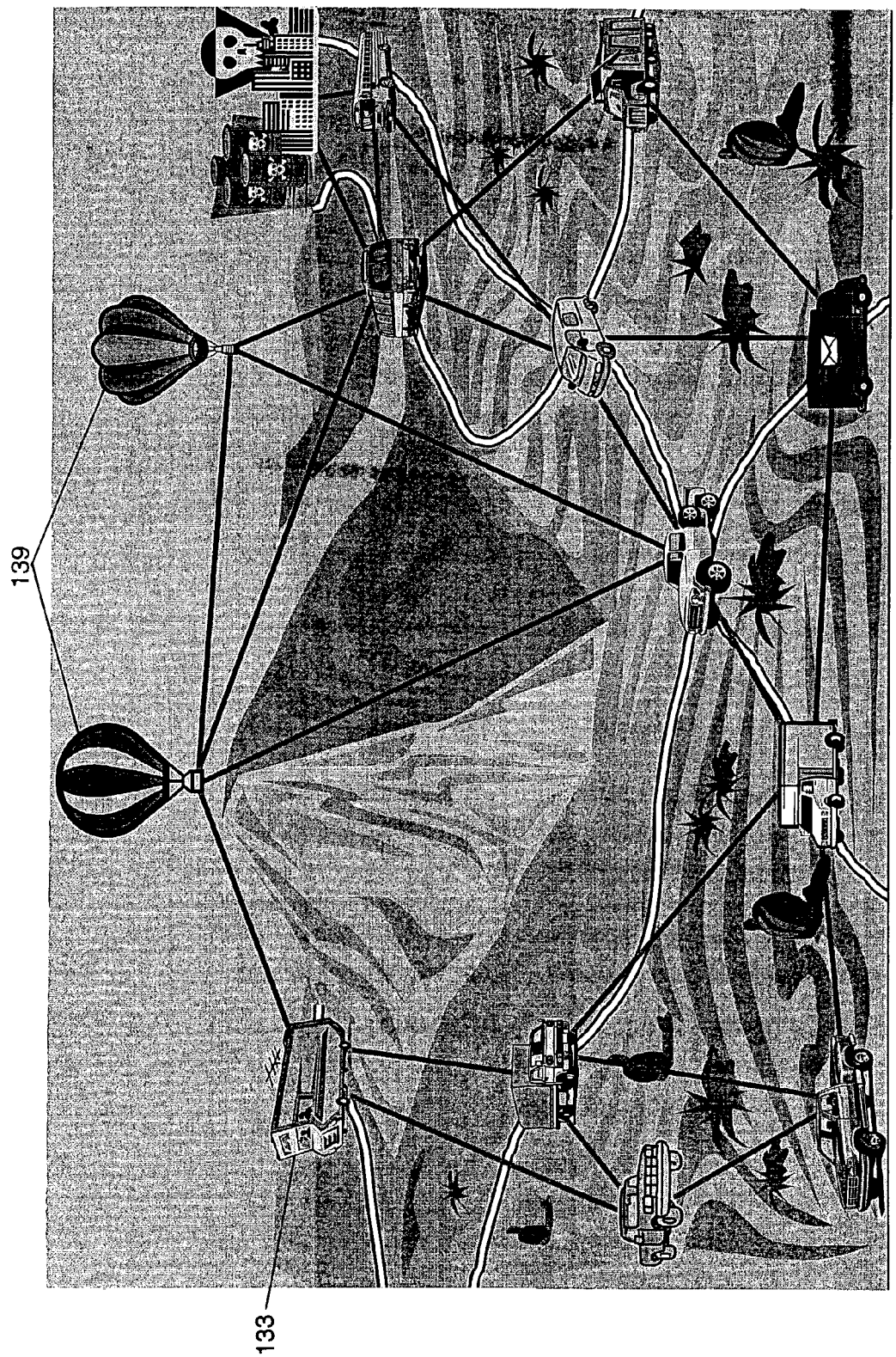
FIG. 13 is a diagram of a still another alternate embodiment in which personal vehicles and balloons host the mobile communications platforms of the ECS, and an incident occurs in mixed terrain suitable for balloon launch and tracking.

Referring now to FIGS. 11, 12 and 13, mobile communications platforms 22 can be deployed on rooftops 135 in densely-populated urban settings as shown in FIG. 11. Mobile communications platforms 22 can also be deployed in unmanned aerial vehicles, for example satellite 137 and balloon 139, to provide beyond-line-of-site communications as illustrated in FIGS. 12 and 13. Satellite 137 provides for long-distance connectivity from the incident site.

Figure 14:
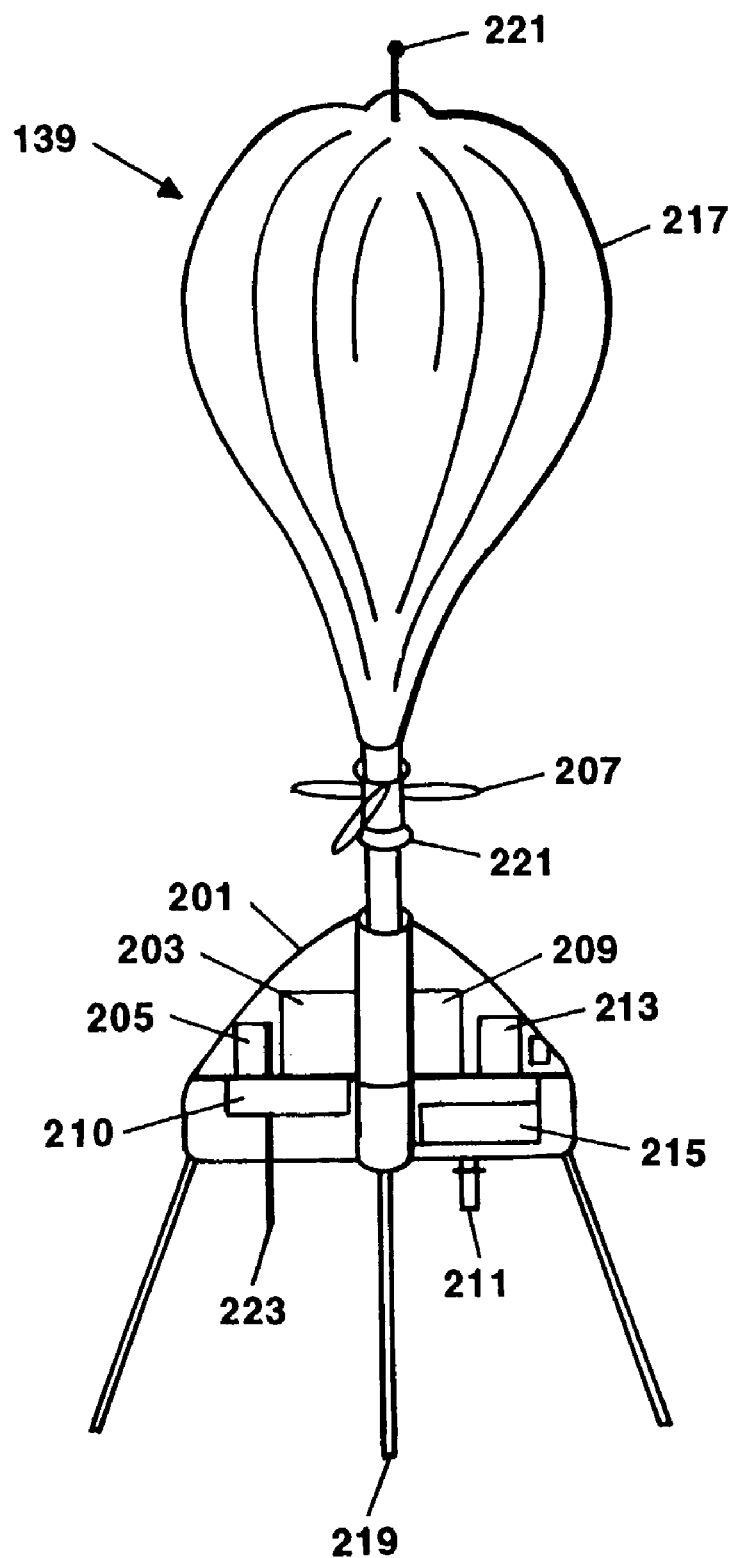
FIG. 14 is a pictorial representation of a balloon-based mobile communications platform of an illustrative embodiment of the present invention.

Referring now to FIG. 14, mobile communications platform 22 can be deployed in a balloon 139 which can include, but isn't limited to, a housing 201, a control processor 203, a local subsystem 205 such as, for example, a global positioning system receiver, network enabling technology 207 such as, for example a wide area network antenna, and a wireless communications capability such as, for example, a wireless local area network radio transceiver 210, wireless wide area network radio transceiver 209, and antenna 223. Balloon 139 further includes video capability 211 such as, for example, a video camera and positioning servo, a radio frequency identification interrogator 213, and a power generator 215, all attached to a helium balloon 217 fitted with a tether 219 and multiple warning lights 221.

Although the invention has been described with respect to various embodiments, it should be realized this invention is also capable of a wide variety of further and other embodiments within the spirit and scope of the appended claims.

We claim:

1. A computerized method for rapid deployment of an emergency communications system comprising the steps of:
   receiving electronic notification through an electronic communications medium of an incident and incident information;
   automatically determining positions to locate mobile electronic communications platforms based on evaluation by computer readable code on a computer readable medium of the incident information;
   deploying the mobile electronic communications platforms to the determined positions;
   initiating operations of the mobile communications platforms by the computer readable code;
   automatically initiating electronic communication among the mobile communications platforms by the computer readable code;
   automatically establishing, by the computer readable code, a temporary communications infrastructure in the vicinity of the incident; and
   deploying personnel based on the determined positions and the incident information and contacting appropriate personnel.

2. The method as defined in claim 1 further comprising the step of:
   receiving real-time location information by the computer readable code when the mobile communications platforms move;
   receiving real-time data by the computer readable code from the mobile communications platforms;
   preparing a situational awareness display by the computer readable code based on the real-time location information and the real-time data.

3. The method as defined in claim 1 wherein the step of initiating communication comprises the step of establishing, by the computer readable code, an ad hoc electronic communications network.

4. The method as defined in claim 1 wherein the step of establishing a temporary communications infrastructure comprises the step of establishing services selected from a group consisting of telephone, radio, computer, and television.

5. The method as defined in claim 1 further comprising the step of training appropriate personnel to set up and operate the mobile communications platforms.

6. The method as defined in claim 1 further comprising the step of broadcasting a notification of the incident to inhabitants in the vicinity of the incident.

7. The method as in claim 1 wherein said step of deploying the mobile electronic communications platforms comprises the step of:
  enabling self-deployment of the mobile electronic communication platforms.

8. The method as in claim 1 wherein the mobile electronic communications platforms self-configure.

9. A system for rapid deployment of an emergency communications system comprising:
  at least one mobile communications platform;
  an electronic receiver capable of receiving electronic notification of an incident and information related to the location of the incident and the severity of the incident;
  an electronic locater computer program subsystem capable of determining at least one position for locating said at least one mobile communications platform, the at least one position based on the information related to the incident location and severity, said electronic locator further capable of determining responding personnel as a function of the at least one position and the incident location and severity and providing information needed for deploying the responding personnel to transport said at least one mobile communications platform to the at least one position, said electronic locator capable of deploying the responding personnel to set up said at least one mobile communications platform at the at least one destination, and said electronic locator capable of deploying the responding personnel to operate said at least one mobile communications platform; and
  an electronic communicator capable of establishing a temporary communications infrastructure in the vicinity of the incident, said electronic communicator capable of initiating communication between the dispatch center and said at least one mobile communications platform, said electronic communicator capable of initiating communication between a first said at least one mobile communications platform and a second said at least one mobile communications platform, said electronic communicator capable of transmitting and receiving control information and data between said first at least one mobile communications platform and said second at least one mobile communications platform.

10. The system as defined in claim 9 further comprising an electronic trainer capable of training the responding personnel to set up and operate said at least one mobile communications platform.

11. The system as defined in claim 9 wherein said electronic communicator forms an ad hoc electronic communications network between said first at least one mobile communications platform and said second at least one mobile communications platform.

12. A system for rapid deployment of mobile communications platforms comprising:
  at least one mobile communications platform;
  a planner computer program subsystem capable of determining at least one position for said at least one mobile communications platform, said at least one position being in the vicinity of an incident;
  a dispatch computer program subsystem capable of directing said at least one mobile communications platform to the at least one position; and
  a control computer program subsystem capable of establishing a temporary communications infrastructure in the vicinity of the incident, said control computer program subsystem enabling flow of information between said at least one mobile communications platform and a dispatch center, said control computer program subsystem capable of enabling flow of information between a first said at least one mobile communications platform and a second said at least one mobile communications platform;
  wherein said dispatch computer program subsystem comprises:
  an electronic director capable of locating the personnel to respond to the incident;
  an electronic contact information locator capable of determining contact information for the personnel; and
  an electronic contacter capable of contacting the personnel.

13. The system as defined in claim 12 wherein said planner computer program subsystem comprises:
  an electronic receiver capable of receiving notification of the incident;
  an electronic component positioner capable of determining, after said electronic receiver has received notification of the incident, said at least one position for said at least one mobile communications platform; and
  an electronic platform locator capable of identifying said at least one mobile communications platform to be deployed to said at least one position.

14. The system as defined in claim 12 further comprising an incident response communicator capable of communicating the incident to inhabitants in the vicinity of the incident.

15. The system as defined in claim 12 wherein said control computer program subsystem comprises:
  a communications manager capable of enabling establishment of the temporary communications infrastructure, said communications manager capable of enabling the personnel to communicate with each other, said communications manager insuring network connectivity, said communications manager providing for communication between a first at least one mobile communications platform and a second at least one mobile communications platform, said communications manager providing routing of data from external networks to the personnel;
  a movement manager capable of providing repositioning direction to said at least one mobile communications platform;
  an incident termination capable of providing dismantling instructions to said at least one mobile communications platform;
  a control handler capable of managing and controlling operations of the at least one mobile communications platform, said control handler capable of receiving directions from external networks through said communications manager and from operators, said control handler capable of routing the received directions to the personnel and to the at least one mobile communications platform through said communications manager, said control handler monitoring the position of the at least one mobile communications platform, said control handler activating said movement manager when the at least one mobile communications platform must change positions, said control handler activating said incident termination when the incident is over; and
  a tracker capable of monitoring location and status of the personnel, said tracker capable of monitoring location and status of equipment related to the incident.

16. The system as defined in claim 12 wherein said at least one mobile communications platform comprises:
  connected devices selected from a group consisting of radio, telephone, video recorder, computer, and radio frequency interrogator;

a communications interface enabling the formation of a network between a first at least one mobile communications platform and a second at least one mobile communications platform, said communications interface capable of transferring electronic data from said connected devices to said at least one mobile communications platform;

a situational awareness handler capable of consolidating said received electronic data, said situational awareness handler capable of routing said consolidated electronic data;

a data handler capable of moving said consolidated electronic data from a first source selected from said connected devices to said situational awareness handler; and a situational awareness display capable of receiving said consolidated electronic data, said situational awareness display capable of displaying said consolidated electronic data.

17. The system as defined in claim 12 further comprising a training subsystem selected from a group consisting of control training, incident termination training, set-up training, and operation training.

18. The system as defined in claim 12 further comprising a wireless ad hoc network, said wireless ad hoc network connecting said at least one mobile communications platform and said dispatch center, said wireless ad hoc network connecting a first said at least one mobile communications platform with a second said at least one mobile communications platform, said wireless ad hoc network including an interface to external networks, said wireless ad hoc network establishing a temporary communications infrastructure.

19. A node for carrying out the method according to claim 1.

20. A computer readable medium having instructions embodied therein for the practice of the method of claim 1.

* * * * *